United States Patent
Chen et al.

(10) Patent No.: US 11,041,378 B2
(45) Date of Patent: Jun. 22, 2021

(54) METHOD AND APPARATUS FOR DETECTION OF PITTING CORROSION UNDER IRON SULFIDE DEPOSITION

(71) Applicant: Saudi Arabian Oil Company, Dhahran (SA)

(72) Inventors: Tao Chen, Dhahran (SA); Qiwei Wang, Dhahran (SA); Fakuen Frank Chang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 77 days.

(21) Appl. No.: 16/505,289

(22) Filed: Jul. 8, 2019

(65) Prior Publication Data
US 2021/0010366 A1    Jan. 14, 2021

(51) Int. Cl.
*E21B 47/00*    (2012.01)
*E21B 47/11*    (2012.01)
(Continued)

(52) U.S. Cl.
CPC ............ *E21B 47/00* (2013.01); *E21B 47/006* (2020.05); *E21B 49/086* (2013.01); *G01N 17/046* (2013.01); *E21B 47/11* (2020.05)

(58) Field of Classification Search
CPC ................................ E21B 47/00; E21B 49/086
See application file for complete search history.

(56) References Cited

U.S. PATENT DOCUMENTS

| | | | |
|---|---|---|---|
| 2,994,778 A * | 8/1961 | Marsh | G21H 5/02 250/303 |
| 3,101,413 A | 8/1963 | Schaschl et al. | |

(Continued)

FOREIGN PATENT DOCUMENTS

| | | |
|---|---|---|
| CN | 105352880 A | 2/2016 |
| EP | 2994778 A1 | 11/1987 |

OTHER PUBLICATIONS

D.C. Eberle et al., "Applications of Radioactive Tracer Technology in the Real-Time Measurement of Wear and Corrosion", Elsevier, May 13, 2005, 1462-1471.

(Continued)

*Primary Examiner* — Robert E Fuller
*Assistant Examiner* — Lamia Quaim
(74) *Attorney, Agent, or Firm* — Bracewell LLP; Constance G. Rhebergen

(57) ABSTRACT

A method for monitoring pitting corrosion of a production tubing in a hydrocarbon well under downhole conditions during a production process using a coupon segment, the method comprising the steps of placing the coupon segment in the hydrocarbon well at a placement depth, the coupon segment is exposed to produced fluids and comprises an outer layer, an inner layer, and a hollow middle layer comprises a tracer fluid operable to leak into the produced fluids when pitting corrosion penetrates the outer layer, operating the production process in the hydrocarbon well such that produced fluids flow through the production tubing to a surface of the hydrocarbon well and wherein the produced fluids contact the coupon segment such that pitting corrosion occurs on the coupon segment; obtaining a sample of the produced fluids at the surface of the hydrocarbon well; and measuring an amount of the tracer fluid in the sample.

13 Claims, 3 Drawing Sheets

(51) Int. Cl.
*E21B 49/08* (2006.01)
*G01N 17/04* (2006.01)

(56) References Cited

U.S. PATENT DOCUMENTS

| | | |
|---|---|---|
| 3,227,881 A | 1/1966 | Gordon et al. |
| 3,348,052 A | 10/1967 | Raifsnider et al. |
| 4,267,148 A | 5/1981 | Dickson et al. |
| 4,395,318 A | 7/1983 | Tait et al. |
| 4,483,397 A | 11/1984 | Gray |
| 4,501,323 A | 2/1985 | Lively et al. |
| 4,605,065 A | 8/1986 | Abercrombie |
| 4,688,638 A | 8/1987 | Williams |
| 5,888,374 A | 3/1999 | Pope et al. |
| 6,015,484 A | 1/2000 | Martinchek et al. |
| 6,131,443 A | 10/2000 | Duncan |
| 6,131,659 A | 10/2000 | Johnson |
| 6,294,074 B1 | 9/2001 | Lin et al. |
| 7,025,138 B2 | 4/2006 | Kurkijan et al. |
| 9,033,036 B2 | 5/2015 | Wilkinson et al. |
| 9,267,874 B2 | 2/2016 | Lorenz et al. |
| 9,359,677 B2 | 6/2016 | MacKenzie et al. |
| 10,107,935 B2 | 10/2018 | Vasquez et al. |
| 2017/0226843 A1* | 8/2017 | Jovancicevic ....... G01N 17/046 |
| 2017/0285219 A1 | 10/2017 | Brady et al. |
| 2017/0350230 A1* | 12/2017 | Dronen .................. G01N 17/04 |

OTHER PUBLICATIONS

Aug. 10, 2018NPL: Tao Chen et al., Corrosion and Scaling Monitoring under Real Downhole Conditions in Sour Gas Well, SPE-KSA-273-MS, Apr. 23-26, 2018, pp. 1-11.

PCT International Search Report dated Oct. 20, 2020, issued in the prosecution of patent application PCT/US2020/040939, 16 pages.

* cited by examiner

METHOD AND APPARATUS FOR DETECTION OF PITTING CORROSION UNDER IRON SULFIDE DEPOSITION

TECHNICAL FIELD

Disclosed are apparatus and methods related to monitoring corrosion. Specifically, disclosed are apparatus and methods related to the monitoring of pitting corrosion downhole.

BACKGROUND

Iron sulfide deposition is a persistent scaling issue in the oil and gas industry. Iron sulfide forms when ferrous ions react with hydrogen sulfide sour gas dissolved in a liquid phase. The ferrous ions can exist in formation water or can be generated by the corrosion of steel components. The hydrogen sulfide sour gas can be dissolved in the produced water or condensate water from the formation. Due to the increased presence of hydrogen sulfide in sour hydrocarbon wells compared to other wells, iron sulfide deposition is of greater concern. The iron sulfide can form deposits on the tubulars used in downhole activities. Pitting corrosion can occur under the iron sulfide deposits causing damage to the tubulars.

Pitting corrosion can cause premature failure to the tubulars, resulting in production loss and workover to replace the damaged tubulars. As a result, monitoring pitting corrosion under iron sulfide deposition effectively and accurately is a major challenge in corrosion management in hydrocarbon wells.

In pitting corrosion monitoring, pitting corrosion downhole is measured through laboratory based instruments and electromechanical techniques, or simulated conditions of the flow stream are used. The laboratory based instruments and electromechanical techniques may not provide representative results due to multiple factors, such as the difference of temperature, pressure, flow regime, flow media, and flow conditions, the results do not always correlate directly to real corrosion rate, and may not indicate pitting corrosion precisely. Laboratory based instruments and electromechanical techniques cannot account for the fluid composition and flow dynamics, such as velocity and phase changes, in a variable wellbore penetrating through long sections of subsurface geological structure. Simulated conditions do not accurately represent conditions of the flow stream downhole without jeopardizing the safety, environment, and human exposure in the laboratory.

Production losses and workover costs caused by pitting corrosion are costly. Alternate approaches for monitoring pitting corrosion that allow for greater flexibility and lower costs are desired.

SUMMARY

Disclosed are apparatus and methods related to monitoring corrosion. Specifically, disclosed are apparatus and methods related to the monitoring of pitting corrosion downhole.

In a first aspect, a method for monitoring pitting corrosion of a production tubing in a hydrocarbon well under downhole conditions during a production process using a coupon segment is provided. The method includes the steps of placing the coupon segment in the hydrocarbon well at a placement depth, where the coupon segment is exposed to produced fluids in the hydrocarbon well. The coupon segment includes an outer layer that includes the same metallurgy as the production tubing and includes a known thickness, an inner layer, and a hollow middle layer that includes a tracer fluid, wherein the tracer fluid is operable to leak from the hollow middle layer into the produced fluids in the hydrocarbon well when pitting corrosion penetrates the outer layer. The method further includes the step of operating the production process in the hydrocarbon well such that produced fluids flow through the production tubing to a surface of the hydrocarbon well, and where the produced fluids contact the coupon segment such that pitting corrosion occurs on the coupon segment, obtaining a sample of the produced fluids at the surface of the hydrocarbon well, and measuring an amount of the tracer fluid in the sample.

In certain aspects the method further includes the steps of determining a pitting corrosion rate of the coupon segment, and estimating pitting corrosion of the production tubing based on the pitting corrosion rate of the coupon segment. In certain aspects, the method further includes the steps of placing one or more additional coupon segments in the hydrocarbon well, wherein each additional coupon segment contains a different tracer fluid, wherein each coupon segment has a different thickness of the outer layer In certain aspects, the step of placing the coupon segment in the hydrocarbon well includes the steps of placing the coupon segment on a coupon holder, attaching the coupon holder to an anchoring segment, and positioning the anchoring segment attached to the coupon holder in the hydrocarbon well with a placement tool. In certain aspects, the hydrocarbon well is selected from the group consisting of a sour gas well, an oil well, and a high hydrogen sulfide content well. In certain aspects, the tracer fluid is selected from the group consisting of inorganic tracer fluids, organic tracer fluids, radioactive tracer fluids, and combinations of the same. In certain aspects, the hydrocarbon well is selected from the group consisting of a sour gas well and an oil well.

In a second aspect, an apparatus for monitoring pitting corrosion of a production tubing in a hydrocarbon well under downhole conditions is provided. The apparatus includes a placement tool configured to retrievably set a downhole pitting corrosion monitoring (DPCM) tool at a placement depth in a hydrocarbon well and the DPCM tool configured to monitor pitting corrosion. The DPCM includes an anchoring segment configured to anchor a coupon holder in the hydrocarbon well, the coupon holder physically anchored by the anchoring segment, the coupon holder configured to hold the coupon segment, wherein the coupon holder includes a cylindrical housing configured to hold one or more coupon segments such that each of the one or more coupon segments is exposed to a produced fluid stream within the production tubing, and the coupon segment anchored by the coupon holder, the coupon segment operable to corrode upon exposure to the produced fluid.

In certain aspects, the placement tool is selected from the group consisting of slickline and coiled tubing. In certain aspects, the anchoring segment includes a gauge hanger. In certain aspects, the means to retrievably anchor the anchoring segment is configured to expand radially outward from the anchoring segment onto the hydrocarbon well. In certain aspects, the coupon segment includes an outer layer that has a known thickness and is exposed to the produced fluid, an inner layer, and a hollow middle layer, wherein the hollow middle layer is defined by the annulus formed by the outer layer and the inner layer, wherein the hollow middle layer includes a tracer fluid. In certain aspects, the known thickness of the outer layer is between 0.5 mm and 10 mm. In certain aspects, each coupon segment can contain a different known thickness of the outer layer. In certain aspects, each coupon segment can contain a different tracer fluid in the hollow middle layer. In certain aspects, the tracer fluid is selected from the group consisting of inorganic tracer fluids, organic tracer fluids, radioactive tracer fluids, and combinations of the same.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
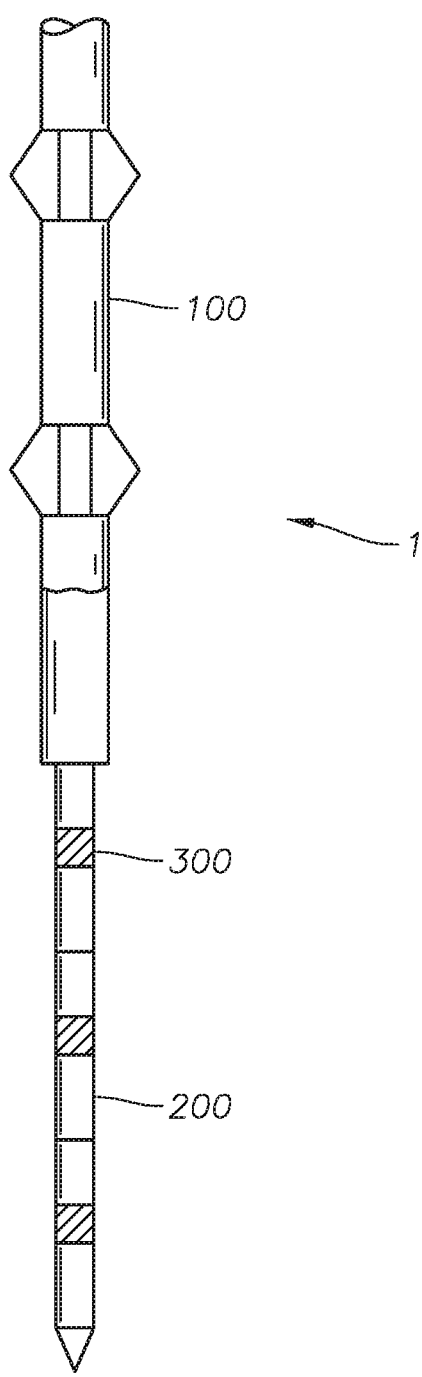
FIG. 1 is a side plan view of an embodiment of the downhole corrosion monitoring tool.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the disclosure.

Accordingly, the embodiments described are set forth without any loss of generality, and without imposing limitations, on the embodiments. Those of skill in the art understand that the scope includes all possible combinations and uses of particular features described in the specification.

Methods and apparatus described here are directed to monitoring downhole pitting corrosion of a production tubing in a hydrocarbon well under downhole conditions.

Advantageously, the methods and apparatus of the downhole pitting corrosion monitoring tool allows for the determination of downhole pitting corrosion in real-time under downhole conditions. Advantageously, the methods and apparatus for monitoring pitting corrosion help develop and deploy effective prevention and mitigation strategies in a timely manner by allowing monitoring of the production tubing while the production tubing is in operation. Advantageously, the methods and apparatus of the monitoring tool reduce costs by providing data for forecasting and scheduling for production tubing replacement. Advantageously, the methods and apparatus of the monitoring tool improve the safety of the production process by reducing the risk of leaking downhole tubing. Advantageously, the downhole pitting corrosion monitoring tool can provide the pitting corrosion rate over time during production. Advantageously, the downhole pitting corrosion monitoring tool can provide multi-point corrosion monitoring.

As used here, "production" or "production process" refers to the stage during exploration or development of hydrocarbons in which hydrocarbons are produced, or attempted to be produced, from a hydrocarbon well using a production tubing.

As used here, "production tubing" refers to any wellbore tubular used to produce fluids from a hydrocarbon well.

As used here, "hydrocarbon well" refers to a wellbore that transverses a fluid-containing formation, where the fluids can include oil, gas, water, and combinations of the same.

As used here, "monitoring" refers to the group of activities performed to monitor the pitting corrosion of the production tubing. Activities can include, but are not limited to, recovering an amount of tracer fluid from the hydrocarbon well, measuring the amount of the tracer fluid recovered from the hydrocarbon well, measuring the pitting corrosion of the coupon segment, and determining the pitting corrosion of the production tubing based on the pitting corrosion of the coupon segment. Monitoring can occur in the well while production in that well is ongoing, thus production and monitoring can overlap and not be distinct stages when considering the wellbore as a whole.

As used here, "iron sulfide deposition" refers to the deposit of iron sulfide on production tubing caused by iron released from the production tubing and reacting with dissolved hydrogen sulfide to form iron sulfide. Iron sulfide deposition can occur in sour hydrocarbon wells containing at least 5.7 milligrams (mg) of hydrogen sulfide per cubic meter ($m^3$) of oil or natural gas, which is equivalent to approximately 4 parts-per-million (ppm) by volume under standard temperature and pressure.

As used here, "pitting corrosion" refers to a localized type of corrosion that results in holes or cavities being formed in the material and differs from uniform corrosion. Pitting corrosion can occur under iron sulfide deposition on production tubing. Materials can corrode and fail at stress levels below their normal yield strength due to pitting corrosion.

As used here, "produced fluid" refers to the fluid that flows from a formation into a hydrocarbon well. Produced fluids can include oil, hydrocarbon gas, and combinations of the same.

As used here, "downhole conditions" refers to the operating conditions in a hydrocarbon well, including the temperature, the pressure, and the flow rate of produced fluids.

As used here, "placement depth" refers to the distance from the surface to the place in the hydrocarbon well where monitoring of pitting corrosion is desired.

Referring to FIG. 1, an embodiment of downhole pitting corrosion monitoring (DPCM) tool 1 is described. DPCM tool 1 can include anchoring segment 100 and coupon holder 200. Anchoring segment 100 can be any type of apparatus capable of securing a tool or instrument within a hydrocarbon well. Anchoring segment 100 can be any elongated member with an axial protrusion, where the axial protrusion has a reduced outer diameter relative to the outer diameter of anchoring segment 100. In at least one embodiment, anchoring segment 100 is a gauge hanger. Anchoring segment 100 can be retrievably secured within a hydrocarbon well using a placement tool. The placement tool can be any mechanical tool capable of selectively securing and retrieving anchoring segment 100 within the hydrocarbon well. Examples of the placement tool can include a slickline or coiled tubing.

Coupon holder 200 can be detachably connected to anchoring segment 100 using any type of detachable fasteners. Examples of detachable fasteners can include threaded fasteners, clamps, buckles, pins, and combinations of the same. In at least one embodiment, coupon holder 200 is attached to anchoring segment 100 by threaded fasteners.

Figure 2:
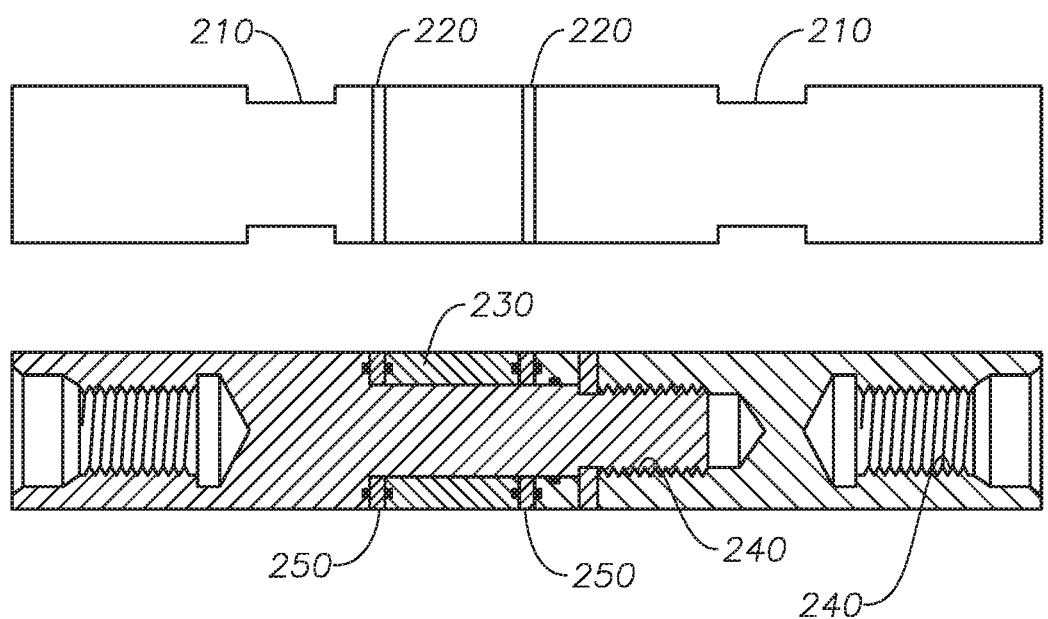
FIG. 2 is a side plan view of an embodiment of a coupon holder.

Coupon holder 200 can be any type of tool capable of securing coupon segment 300 at a placement depth. Coupon holder 200 can be sized to fit with anchoring segment 100 and to hold coupon segment 300 downhole in a hydrocarbon well such that coupon segment 300 is exposed to the flow of the produced fluids. Coupon holder 200 can be cylindrical in shape. The length of coupon holder 200 can be based on the number of coupon segments 300 desired to be installed. The diameter of coupon holder 200 can be based on the internal diameter of coupon segment 300. Coupon holder 200 can include any means for securing coupon segment 300, such that coupon segment 300 can be placed on the exterior of coupon holder 200. In at least one embodiment, the means for securing coupon segment 300 on coupon holder 200 can be notches 210 as shown in FIG. 2. Notches 210 can secure each coupon segment 300 in place on coupon holder 200. At each notch 210, peeks 220 and sleeves 230 can insulate coupon segment 300 from coupon holder 200 to eliminate and alternately reduce galvanic corrosion between coupon segment 300 and coupon holder 200. Coupon holder 200 and Coupon segment 300 can be made from different metal materials, which can lead to galvanic corrosion if the two different metal materials are in direct contact. Galvanic corrosion can change the corrosion mechanism of the coupon segment and as a result affect the monitoring of pitting corrosion. Coupon holder 200 is in the absence of direct contact with coupon segment 300. Sleeve 230 can be selected from any material capable of withstanding the wellbore conditions and preventing direct contact between coupon holder 200 and coupon segment 300. In at least one embodiment, sleeve 230 is a polytetrafluoroethylene (PTFE) material. O-ring 250 can seal the gap between peek 220 and coupon segment 300. O-ring 250 can ensure that production fluids do not interact with the inner layer of coupon segment 300 to prevent corrosion of the inner layer. Corrosion of the inner layer of coupon segment 300 is different from corrosion of the outer layer of coupon segment 300 because the outer layer is under dynamic flow conditions. O-ring 250 can be any material capable of withstanding wellbore conditions and providing a seal between coupon segment 300 and peeks 220. In at least one embodiment, o-ring 250 is a fluoroelastomer material. In at least one embodiment, the fluoroelastomer material is an ASTM standard FKM. Set screws 240 on coupon holder 200 can secure coupon segment 300 between different parts of coupon holder 200 and alternately can be used to secure two separate coupon holders together. In at least one embodiment, coupon holder 200 can be assembled from different pieces, where after assembly, coupon segment 300, sleeve 230, and o-ring 250 can be positioned between the different pieces.

Coupon holder 200 can contain one or more coupon segments 300. Coupon holder 200 can contain between 1 and 10 coupon segments 300, alternately between 5 and 10 coupon segments, alternately greater than 10 coupon segments, alternately between 1 and 3 coupon segments 300, alternately between 1 and 5 coupon segments 300 and alternately between 2 and 4 coupon segments 300. The number of coupon segments 300 can be determined based on the number desired and physically capable of being deployed in a well.

Figure 3:
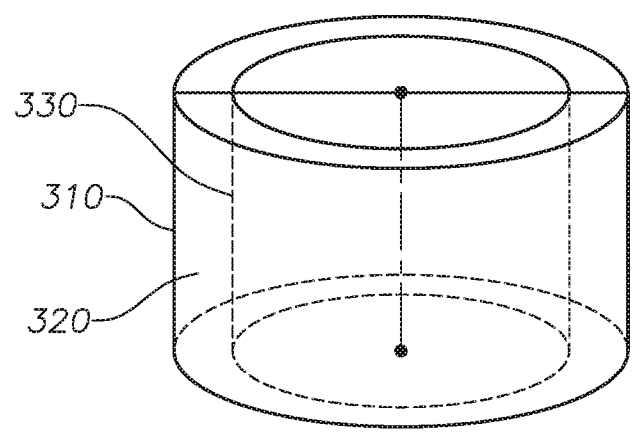
FIG. 3 is a perspective view of an embodiment of a coupon segment.

Coupon segment 300 can be described with reference to FIG. 3. Coupon segment 300 can be a hollow metal specimen. Coupon segment 300 can include outer layer 310, hollow middle layer 320, and inner layer 330. Hollow middle layer 320 is defined by outer layer 310 and inner layer 330. Coupon segment 300 can be cylindrical where hollow middle layer 320 is the annulus between inner layer 330 and outer layer 310. Coupon segment 300 can be the same metallurgy as the production tubing, alternately outer layer 310 can be the same metallurgy as the production tubing and inner layer 330 can be of a different material. The length of coupon segment 300 can be based on the size of coupon holder 200. The outer diameter and inner diameter of coupon segment 300 can be based on the desired volume of hollow middle layer 320 and in consideration of the size of coupon holder 200. Coupon segment 300 can be designed with a known thickness of outer layer 310. The known thickness of outer layer 310 can be between 0.5 millimeters (mm) and 10 mm, alternately can be between 0.5 mm and 5 mm, alternately can be 0.5 mm, alternately can be 1 mm, alternately can be 2 mm, alternately can be 3 mm, alternately can be 4 mm, alternately can be 5 mm, alternately can be 6 mm, alternately can be 7 mm, alternately can be 8 mm, alternately can be 9 mm, and alternately can be 10 mm. In at least one embodiment where the DPCM tool contains more than one coupon segment 300, each coupon segment 300 can have outer layer 310 with a different known thickness. In an alternate embodiment where DPCM tool contains more than one coupon segment 300, outer layer 310 of each coupon segment 300 can have the same known thickness. Coupon segment 300 can be placed around coupon holder 200, such that coupon holder 200 extends through inner layer 330.

Hollow middle layer 320 can contain a tracer fluid. The tracer fluid can be any type of chemical that can disperse in the produced fluid from the hydrocarbon well and can be collected to infer information about the hydrocarbon well, movement and saturation of the fluids. The tracer fluids can be water soluble or oil soluble. Examples of tracer fluids suitable for use in the DPCM tool include inorganic tracer fluids, organic tracer fluids, radioactive tracer fluids, and combinations of the same. Examples of tracer fluids for use in the DPCM tool can include inorganic tracer fluids, organic tracer fluids, and combinations of the same. Examples of inorganic tracer fluids include nitrate ($NO_3^-$) ions, bromide ($Br^-$) ions, iodide ($I^-$) ions, hydrogen borate ($HBO_3^-$) ions, and combinations of the same. Examples of organic tracer fluids include organic nitrates, fluorescein, methanol, and combinations of the same. Examples of radioactive tracer fluids include oxygen-18 ($^{18}O$), oxygen-16 ($^{16}O$), chlorine-36 ($^{36}Cl$), nickel-63 ($^{63}Ni$), and combinations of the same. The specific tracer fluid selected can be based on the fluid properties of the produced fluids. In at least one embodiment where the DPCM tool includes more than one coupon segment 300, each coupon segment 300 can include a different tracer fluid. In at least one embodiment, the DPCM tool can include more than one coupon segment 300 where each coupon segment 300 has a different thickness and different metallurgy and each coupon segment can include a different tracer fluid allowing for measuring or monitoring the pitting corrosion rate over time. In an alternate embodiment where DPCM tool contains more than one coupon segment 300, each coupon segment 300 can have the same tracer fluid.

Coupon holder 200 and coupon segment 300 can include sealing components. The sealing components can be any type of mechanical seal or isolation component that can fit between coupon segment 300 and coupon holder 200 to prevent corrosion in the space between coupon segment 300 and coupon holder 200. Sealing components can help to seal coupon segment 300 to prevent leakage of the tracer fluid.

Figure 4:
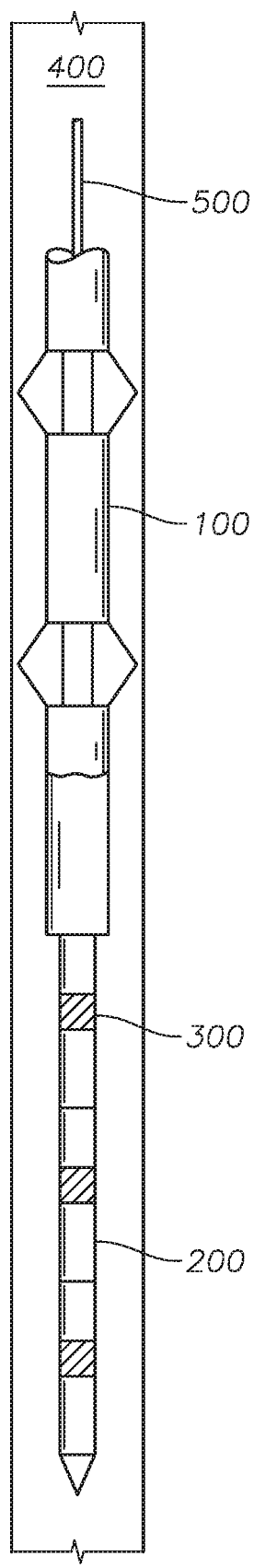
FIG. 4 is a side plan view of an embodiment of the downhole corrosion monitoring tool.

Advantageously, coupon segment 300 is not part of a pipe body deployed downhole and therefore can be retrieved at any point during production Referring to FIG. 4 a method of using DPCM tool 1 is provided. The method employing DPCM tool 1 allows for real-time analysis of corrosion during production. DPCM tool 1 is placed in hydrocarbon well 400 by placement tool 500 at a placement depth. In at least one embodiment, the placement depth can be determined by historical well log data, such as where iron sulfide deposits have been observed. In an alternate embodiment, the placement depth can be below 6000 feet from the surface, as iron sulfide scale deposits can be found below 6000 feet. In at least one embodiment, DPCM tool 1 can hang from placement tool 500 in the middle of hydrocarbon well 400. Hydrocarbon well 400 can be any type of well traversing a formation containing at least 4 parts-per-million (ppm) by volume hydrogen sulfide in hydrocarbon gas. Examples of hydrocarbon well 400 can include a sour gas well, an oil well, and a high hydrogen sulfide content well. "High hydrogen sulfide content" refers to a hydrogen sulfide content of 20 percent or less and alternately between 15 percent and 20 percent.

DPCM tool 1 can contain one or more coupon segments 300 on coupon holder 200. The one or more coupon segments 300 can contain one or more tracer fluids and have one or more thicknesses. The one or more coupon segments 300 can be the same metallurgy as the production tubing. Coupon segments 300 are exposed to the produced fluids flowing through hydrocarbon well 400. As the produced fluids flow by coupon segments 300 corrosion can occur causing iron sulfide deposition and pitting corrosion. When the pitting corrosion penetrates outer layer 310 of coupon segment 300 the tracer fluid can leak into the produced fluid and be carried in the produced fluid to the surface. At the surface, samples of the produced fluid can be obtained. The amount of tracer fluid in each sample can be measured. In an alternate embodiment, the presence of the tracer fluid in the sample can be detected without measuring an amount of the tracer fluid. The samples can be obtained with regular frequency to determine a pitting corrosion rate. The pitting corrosion rate is the penetration depth of the pitting corrosion over time. The pitting corrosion rate can be used to develop a schedule for replacement of the production tubing.

In embodiments where more than one coupon segment 300 is included in DPCM tool 1 and each coupon segment 300 has a different thickness and a different tracer fluid, samples of the produced fluid obtained at regular frequency can be analyzed to determine the presence of the different tracer fluids. The use of more than one coupon segment with different thicknesses can provide a method to measure pitting corrosion over a longer time period and develop a more accurate view of the corrosion process. Advantageously, the pitting corrosion rate can be used to develop a schedule for replacement of the production tubing. The DCPM tool 1 can be used in wellbores with temperature up to 350 degrees Fahrenheit (° F.) and pressures up to 9000 pounds per square inch (psi).

For illustrative purposes only the following example is provided. DCPM tool 1 contains three coupon segment 300. First coupon segment 300 has a thickness of outer layer 310 of 0.5 mm and contains tracer fluid A. Second coupon segment 300 has a thickness of outer layer 310 of 1 mm and contains tracer fluid B. Third coupon segment 300 has a thickness of outer layer 310 of 2 mm and contains tracer fluid C. DCPM tool 1 is placed in hydrocarbon well 400. Samples of produced fluid are obtained at a frequency of 1 hour. If after 10 hours tracer fluid A is detected in the sample of produced fluid and after 20 hours tracer fluid B is detected in the sample of produced fluid and after 40 hours tracer fluid C is detected in the produced fluid, the penetration depth over time would result in a pitting corrosion rate of 0.05 mm per hour.

The downhole pitting corrosion monitoring tool is in the absence of surface activation of the coupon segment. The coupon segments of the downhole corrosion monitoring tool do not have to be removed from the hydrocarbon well to measure corrosion. The downhole pitting corrosion monitoring tool is in the absence of electrodes to measure pitting corrosion.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value or between about one particular value and about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A method for monitoring pitting corrosion of a production tubing in a hydrocarbon well under downhole conditions during a production process using a coupon segment, the method comprising the steps of:
    placing the coupon segment in the hydrocarbon well at a placement depth, wherein the coupon segment is exposed to produced fluids, wherein the coupon segment comprises:
        an outer layer, wherein the outer layer comprises the same metallurgy as the production tubing, wherein the outer layer comprises a known thickness,
        an inner layer, and
        a hollow middle layer, wherein the hollow middle layer comprises a tracer fluid, wherein the tracer fluid is operable to leak from the hollow middle layer into the produced fluids when pitting corrosion penetrates the outer layer;
    operating the production process in the hydrocarbon well such that produced fluids flow through the production tubing to a surface of the hydrocarbon well, and wherein the produced fluids contact the coupon segment such that pitting corrosion occurs on the coupon segment;
    obtaining a sample of the produced fluids at the surface of the hydrocarbon well;
    measuring an amount of the tracer fluid in the sample; and
    placing one or more additional coupon segments in the hydrocarbon well, wherein each additional coupon segment contains a different tracer fluid, wherein each coupon segment has a different thickness of the outer layer.

2. The method of claim 1, further including:
    determining a pitting corrosion rate of the coupon segment; and
    estimating pitting corrosion of the production tubing based on the pitting corrosion rate of the coupon segment.

3. The method of claim 1, wherein the step of placing the coupon segment in the hydrocarbon well comprises the steps of:
    placing the coupon segment on a coupon holder; attaching the coupon holder to an anchoring segment; and
    positioning the anchoring segment attached to the coupon holder in the hydrocarbon well with a placement tool.

4. The method of claim 1, wherein the hydrocarbon well is selected from the group consisting of a sour gas well, an oil well, and a high hydrogen sulfide content well.

5. The method of claim 1, wherein the tracer fluid is selected from the group consisting of inorganic tracer fluids, organic tracer fluids, radioactive tracer fluids, and combinations of the same.

6. The method of claim 1, wherein the hydrocarbon well is selected from the group consisting of a sour gas well and an oil well.

7. An apparatus for monitoring pitting corrosion of a production tubing in a hydrocarbon well under downhole conditions, the apparatus comprising:
    a placement tool, the placement tool configured to retrievably set a downhole pitting corrosion monitoring (DPCM) tool at a placement depth in a hydrocarbon well; and
    the DPCM tool, the DPCM configured to monitor pitting corrosion, the DPCM comprising:
        an anchoring segment, the anchoring segment configured to anchor a coupon holder in the hydrocarbon well;
        the coupon holder physically anchored by the anchoring segment, the coupon holder configured to hold one or more coupon segments, wherein the coupon holder comprises a cylindrical housing configured to hold the one or more coupon segments such that each coupon segment is exposed to a produced fluid stream within the production tubing; and
        the coupon segment anchored by the coupon holder, the coupon segment operable to corrode upon exposure to the produced fluid, wherein each coupon segment comprises:
            an outer layer, the outer layer comprising a known thickness, wherein the outer layer is exposed to the produced fluid;
            an inner layer; and
            a hollow middle layer, wherein the hollow middle layer is defined by the annulus formed by the outer layer and the inner layer, wherein the hollow middle layer comprises a tracer fluid,
                wherein each coupon segment has a different known thickness of the outer layer and wherein each coupon segment contains a different tracer fluid in the hollow middle layer.

8. The apparatus of claim 7, wherein the placement tool is selected from the group consisting of slickline and coiled tubing.

9. The apparatus of claim 7, wherein the anchoring segment comprises a gauge hanger.

10. The apparatus of claim 7, wherein the means to retrievably anchor the anchoring segment is configured to expand radially outward from the anchoring segment onto the hydrocarbon well.

11. The apparatus of claim 7, wherein the known thickness of the outer layer is between 0.5 mm and 10 mm.

12. The apparatus of claim 7, wherein the tracer fluid is selected from the group consisting of inorganic tracer fluids, organic tracer fluids, radioactive tracer fluids, and combinations of the same.

13. The apparatus of claim 7, wherein the hydrocarbon well is selected from the group consisting of a sour gas well and an oil well.

* * * * *